United States Patent
Nakayama

(10) Patent No.: US 9,306,925 B2
(45) Date of Patent: Apr. 5, 2016

(54) IMAGE PROCESSING APPARATUS AND IMAGE PROCESSING SYSTEM

(71) Applicant: Hiroto Nakayama, Nagoya (JP)

(72) Inventor: Hiroto Nakayama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1 day.

(21) Appl. No.: 14/183,594

(22) Filed: Feb. 19, 2014

(65) Prior Publication Data

US 2014/0237546 A1  Aug. 21, 2014

(30) Foreign Application Priority Data

Feb. 19, 2013 (JP) ................................ 2013-029847
May 29, 2013 (JP) ................................ 2013-113435

(51) Int. Cl.
  *H04L 29/06*  (2006.01)
  *H04L 9/32*  (2006.01)
  *G06F 21/30*  (2013.01)
  *G06F 21/31*  (2013.01)

(52) U.S. Cl.
  CPC ............... *H04L 63/08* (2013.01); *G06F 21/30* (2013.01); *G06F 21/31* (2013.01); *H04L 9/32* (2013.01)

(58) Field of Classification Search
  CPC ........... H04L 63/08; H04L 9/32; G06F 21/30; G06F 21/31
  USPC ................................... 726/3, 27, 28; 713/182
  See application file for complete search history.

(56) References Cited

U.S. PATENT DOCUMENTS

| 2003/0093670 A1* | 5/2003 | Matsubayashi | G06F 3/1212 713/168 |
| 2006/0136992 A1* | 6/2006 | Shigeeda | 726/2 |
| 2007/0171467 A1* | 7/2007 | Mokuya | G06F 3/1208 358/1.15 |
| 2008/0192286 A1* | 8/2008 | Shaw | 358/1.15 |
| 2009/0091786 A1* | 4/2009 | Yamaguchi | H04N 1/00222 358/1.15 |
| 2009/0262387 A1* | 10/2009 | Sakakibara | H04N 1/00222 358/1.15 |
| 2010/0027054 A1* | 2/2010 | Reddy et al. | 358/1.15 |
| 2010/0171982 A1* | 7/2010 | Sato | 358/1.15 |
| 2010/0208286 A1* | 8/2010 | Iwata | G06F 21/608 358/1.14 |
| 2010/0238501 A1* | 9/2010 | Fujimaki | H04L 67/02 358/1.15 |
| 2010/0245909 A1* | 9/2010 | Yamaguchi | 358/1.15 |
| 2011/0063667 A1* | 3/2011 | Nishida | 358/1.15 |
| 2011/0093921 A1* | 4/2011 | Tsujimoto | 726/3 |
| 2011/0126270 A1* | 5/2011 | Sato et al. | 726/4 |

(Continued)

FOREIGN PATENT DOCUMENTS

JP  2008-026932 A  2/2008
JP  2009234106 A  10/2009

*Primary Examiner* — Sarah Su

(74) *Attorney, Agent, or Firm* — Banner & Witcoff, Ltd.

(57) ABSTRACT

An image processing apparatus including: a first interface; a second interface configured to be connected with a server configured to perform user authentication; an image processing unit configured to execute a job including image processing; and a control device configured to: receive authentication information of a user via the first interface; transmit the received authentication information to the server via the second interface; execute a specific operation after receiving the authentication information, the specific operation being a part of the job; receive a result of the user authentication from the server after executing the specific operation; determine whether the user authentication by the server has been successful in accordance with the received result; and execute the rest of the job after completing the specific operation and determining that the user authentication has been successful.

20 Claims, 10 Drawing Sheets

(56) References Cited

U.S. PATENT DOCUMENTS

| | | | |
|---|---|---|---|
| 2012/0250066 A1* | 10/2012 | Kikumoto | G06F 3/1222 358/1.14 |
| 2013/0002750 A1* | 1/2013 | Takenouchi | B41J 29/38 347/16 |
| 2013/0100478 A1* | 4/2013 | Ogasawara | G06F 3/122 358/1.14 |
| 2013/0155454 A1* | 6/2013 | Saitoh et al. | 358/1.15 |
| 2014/0092420 A1* | 4/2014 | Fukudome | 358/1.14 |
| 2014/0146344 A1* | 5/2014 | Mitsui | H04N 1/32117 358/1.14 |
| 2014/0211240 A1* | 7/2014 | Maki | G06F 3/1222 358/1.14 |
| 2014/0237546 A1* | 8/2014 | Nakayama | H04L 63/08 726/3 |
| 2014/0240746 A1* | 8/2014 | Ichikawa | 358/1.14 |
| 2015/0077785 A1* | 3/2015 | Harano | G06F 3/121 358/1.14 |

* cited by examiner

| ID | AFFILIATION | USER NAME | PASSWORD |
|---|---|---|---|
| 0001 | GROUP A | USER 1 | 1234 |
| 0002 | GROUP A | USER 2 | 5678 |
| 0003 | GROUP A | USER 3 | 9012 |
| 0004 | GROUP A | USER 4 | 3456 |
| 0005 | GROUP B | USER 5 | 7890 |

| ID | AFFILIATION | USER NAME | RESTRICTION INFORMATION | | | | | |
|---|---|---|---|---|---|---|---|---|
| | | | PRINTING | COPY | FAX | SCAN | MAXIMUM NUMBER | REMAINING NUMBER |
| 001 | GROUP A | USER 1 | ○ | ○ | ○ | ○ | — | 500 |
| 002 | GROUP A | USER 2 | ○ | ○ | ○ | ○ | 500 | 600 |
| 003 | GROUP A | USER 3 | × | × | ○ | ○ | 100 | 100 |
| 999 | — | UNREGISTERED | × | × | ○ | × | 50 | 50 |

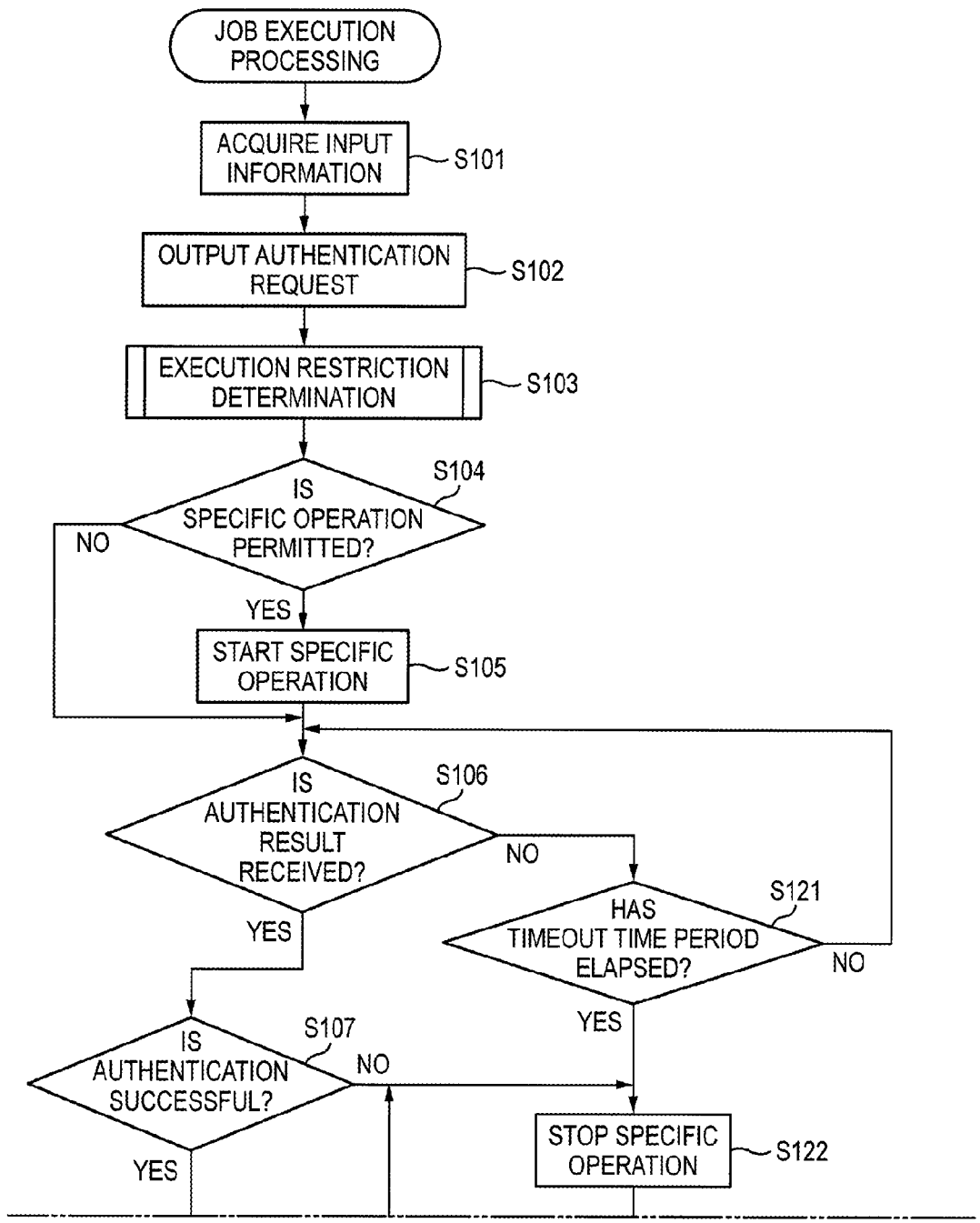

| JOB TYPE | SPECIFIC OPERATION |
|---|---|
| PC PRINTING | INK CLEANING, WARMING UP OF FIXING DEVICE |
| FAX TRANSMISSION | PANEL OPERATION, WARMING UP OF SCANNER |
| FAX RECEPTION PRINTING | INK CLEANING, WARMING UP OF FIXING DEVICE |
| COPY | PANEL OPERATION, WARMING UP OF SCANNER |
| SCAN | PANEL OPERATION, WARMING UP OF SCANNER |

| FIG. 9A |
| FIG. 9B | even # IMAGE PROCESSING APPARATUS AND IMAGE PROCESSING SYSTEM

CROSS-REFERENCE TO RELATED APPLICATIONS

This application claims priority from Japanese Patent Application No. 2013-029847 filed on Feb. 19, 2013, and Japanese Patent Application No. 2013-113435 filed on May 29, 2013, the entire contents of which are incorporated herein by reference.

TECHNICAL FIELD

Aspects of the invention relate to an image processing apparatus and an image processing system performing image processing. More particularly, the aspects of the invention relate to a technology of performing user authentication by a server, which communicates with an image processing apparatus, and performing image processing on the basis of a result of the user authentication.

BACKGROUND

In an image processing system having an image processing apparatus and a server, a technology of restricting performance of image processing for each user on the basis of information of a user authenticated by the server has been known. In the image processing system, authentication information is transmitted from the image processing apparatus to the server, the server authenticates the user, and the image processing apparatus permits execution of a job during which the image processing is performed when a success result of the user authentication is received from the server.

As an example, related-art discloses a digital complex machine that is connected to an authentication server, receives an input of authentication information through a login screen, requests the authentication server to authenticate a user based on the authentication information, and performs printing processing or FAX transmission processing on when a success result of the user authentication is received from the authentication server.

SUMMARY

However, the related-art has the following problem. That is, the image processing apparatus acquires the result of the user authentication performed by the server and then starts executing a job. For this reason, for the image processing apparatus, there is waste of time after requesting the server to authenticate a user until acquiring the result of the user authentication.

Accordingly, aspects of the invention provide an image processing apparatus and an image processing system capable of effectively utilizing time after requesting a server to authenticate a user until a result of the user authentication is acquired.

According to an aspect of the invention there is provided an image processing apparatus including: a first interface; a second interface configured to be connected with a server, the server being configured to perform user authentication; an image processing unit configured to execute a job, the job including image processing; and a control device configured to: receive authentication information of a user via the first interface; transmit the received authentication information to the server via the second interface; execute a specific operation after receiving the authentication information, the specific operation being a part of the job; receive a result of the user authentication from the server after executing the specific operation; determine whether the user authentication by the server has been successful in accordance with the received result; and execute the rest of the job after completing the specific operation and determining that the user authentication has been successful.

According to another aspect of the invention, there is provided an image processing system including: an image processing apparatus configured to be connected with a server and execute a job, the job including image processing; and the server configured to store user information for identifying a user, wherein the image processing apparatus is configured to receive authentication information of a user, wherein the image processing apparatus is configured to transmit the received authentication information to the server, wherein the image processing apparatus is configured to execute a specific operation after receiving the authentication information, the specific operation being a part of the job, wherein the server is configured to perform user authentication by using the transmitted authentication information, wherein the image processing apparatus is configured to receive a result of the user authentication from the server after executing the specific operation, wherein the image processing apparatus is configured to determine whether the user authentication by the server has been successful in accordance with the received result, and wherein the image processing apparatus is configured to execute the rest of the job after completing the specific operation and determining that the user authentication has been successful.

BRIEF DESCRIPTION OF DRAWINGS

FIG. 2 shows a configuration of a user registration table of an authentication server:

FIG. 3 shows a configuration of a user restriction table of an MFP (complex machine);

DETAILED DESCRIPTION

Hereinafter, an image processing system according to an illustrative embodiment will be specifically described with reference to the accompanying drawings. In the illustrative embodiment, the invention is applied to an image processing system including an authentication server performing user authentication and a complex machine (MFP: Multi Function Peripheral) having a plurality of functions relating to image processing.

Figure 1:
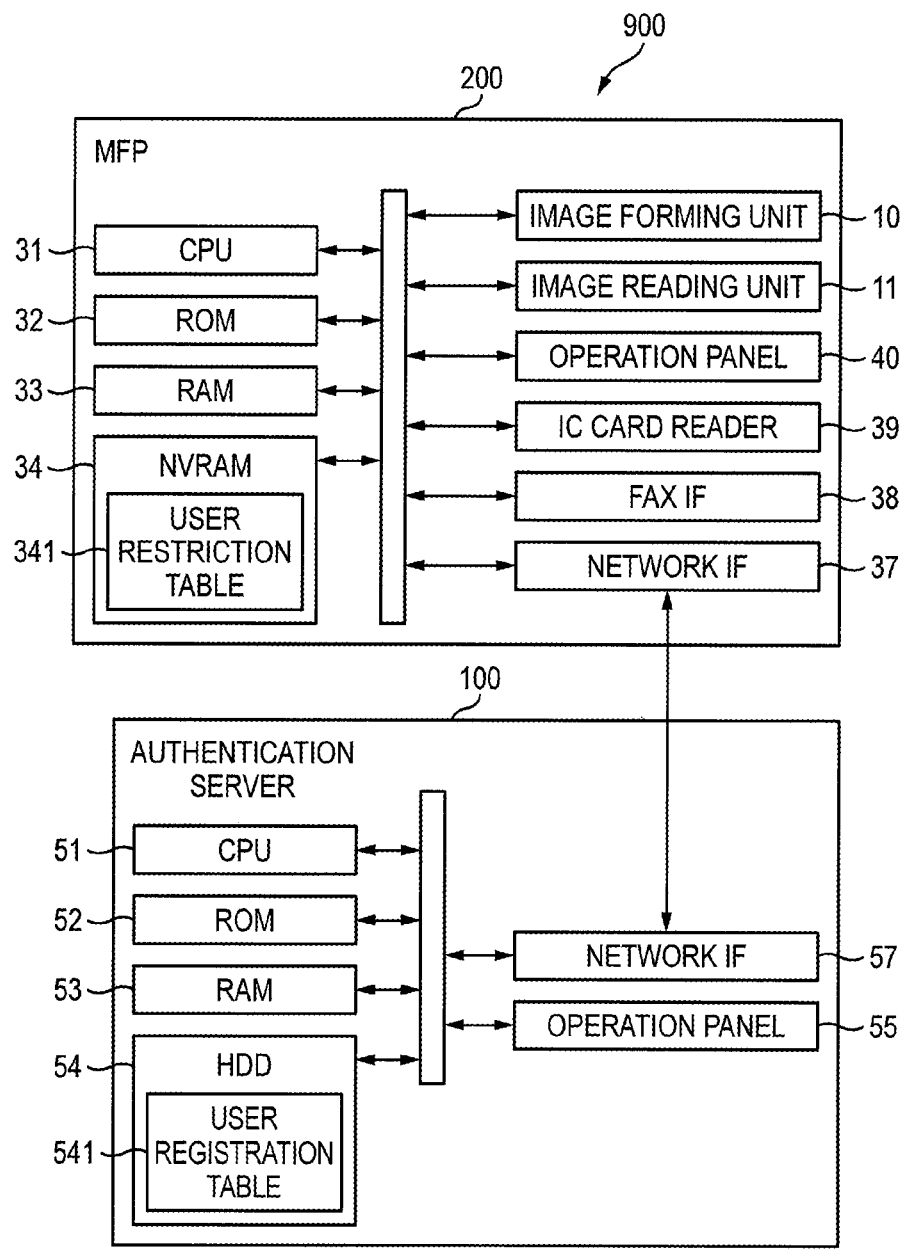
FIG. 1 is a block diagram showing a configuration of an image processing system according to an illustrative embodiment.

An image processing system 900 (which is an example of the image processing system) of this illustrative embodiment has an authentication server 100 (which is an example of the server) and an MFP 200 (which is an example of the image processing apparatus), as shown in FIG. 1. The MFP 200 has a plurality of functions relating to image processing such as printing, reading and the like. Also, the MFP 200 outputs an authentication request to the authentication server 100 and restricts execution of the image processing, based on a result of the authentication. The authentication server 100 performs, in response to the authentication request, user authentication on the basis of user information attached to the authentication request, and sends a result thereof.

In the image processing system 900, a plurality of image processing apparatuses having the image processing function may be connected in addition to the MFP 200. Also, regarding the authentication server performing the user authentication, multiple authentication servers may be connected in addition to the authentication server 100.

Subsequently, a schematic configuration of the authentication server 100 will be described. As shown in FIG. 1, the authentication server 100 has a CPU 51, a ROM 52, a RAM 53 and an HDD 54. Also, the authentication server 100 has an operation panel 55 having a display function and an input function and a network interface 57 enabling communication with an external apparatus, which are controlled by the CPU 51.

In the HDD 54 of the authentication server 100, a variety of programs and data such as an OS, a browser for accessing data on the Internet, device drivers for controlling various devices, etc., are stored.

Also, the HDD 54 stores therein a user registration table 541 as shown in FIG. 2, as information for performing the user authentication. Specifically, the user registration table 541 stores records including four items. The four items are an identification number (ID), an affiliation, a user name and a password. In the meantime, the configuration of the records of the user registration table 541 is not limited thereto and may include other items. Also, it is only necessary that information capable of specifying a user is included, and it is not necessary to include all of the affiliation, the user name and the password.

The CPU 51 performs a variety of processing while storing a calculation result in the RAM 53 or the HDD 54, in response to a control program read out from the ROM 52 or a program read out from the HDD 54.

The network interface 57 is an interface enabling communication with other apparatuses. The authentication server 100 can transmit and receive data to and from the MFP 200 through the network interface 57.

Subsequently, a schematic configuration of the MFP 200 will be described. As shown in FIG. 1, the MFP 200 has a CPU 31 (which is an example of the control device), a ROM 32, a RAM 33 and an NVRAM (Non-Volatile RAM) 34 (which is an example of the storage unit). Also, the MFP 200 has an image forming unit 10 (which is an example of the image processing unit) that prints an image on a sheet, an image reading unit 11 (which is an example of the image processing unit) that reads an image of a document, an operation panel 40 (which is an example of the first interface and the operational interface) having a display function and an input function, an IC card reader 39 (which is an example of the first interface) that reads information of an IC card, a FAX interface 38 and a network interface 37 (which is an example of the second interface), which are controlled by the CPU 31.

The image forming unit 10 may execute a color printing or only a monochrome printing. In this illustrative embodiment, the image forming unit 10 can execute a color printing. Also, regarding a printing method, an electrophotographic method or inkjet method is possible. Also, the image reading unit 11 may execute a color scan or only a monochrome scan. In this illustrative embodiment, the image reading unit can execute a color scan. Also, regarding a reading mechanism, both a CCD and a CIS can be used.

The ROM 32 stores therein firmware, which is a control program for controlling the MFP 200, a variety of settings and initial values and the like. The RAM 33 and the NVRAM 34 are used as work areas from which the various control programs are read out or storage areas in which data is temporarily stored.

The CPU 31 controls the respective constitutional elements of the MFP 200 while storing processing results in the RAM 33 or NVRAM 34, in response to the control programs read out from the ROM 32 or signals sent from various sensors.

The network interface 37 and the FAX interface 38 are interfaces enabling communication with other apparatuses. The MFP 200 transmits an authentication request to the authentication server 100 and receives an authentication result through the network interface 37. Also, the MFP 200 can transmit and receive FAX data through the FAX interface 38.

The operation panel 40 is provided on an outer side of the MFP 200 and has a variety of buttons for receiving a user input and a touch panel for displaying a message or setting contents. The various buttons include an OK button for inputting an instruction to start the image processing and a cancel button for inputting an instruction to cancel the image processing. Also, various inputs can be input to the touch panel by a touch operation of the user and a variety of settings and user information are input through the touch panel, for example.

Also, the NVRAM 34 stores therein a user restriction table 341 as shown in FIG. 3, as information for restricting execution of the image processing. Specifically, the user restriction table 341 has records including four items. The four items are an identification number (ID), an affiliation, a user name and restriction information.

Also, regarding the restriction information, whether the respective image processing of printing, copy, FAX and scan can be executed is stored. In FIG. 3, 'o' means that the execution is permitted and 'x' means that the execution is not permitted. Also, regarding the restriction information, a maximum number indicating the maximum number of sheets to be processed, which can be executed in one job, is stored. In the maximum number, '-' means that there is no restriction on the maximum number of sheets to be processed. Also, regarding the restriction information, a remaining number indicating the remaining number of sheets, which can be processed, is stored. In the meantime, the record configuration of the user restriction table 341 is not limited to the above and may include other items. The configuration of the restriction information is not limited to the above-described configuration and may include other items. Also, it is only necessary that the information specifying a user and the restriction information corresponding to the user are associated with each other, and the affiliation and the user name need not necessarily be used.

The user restriction table 341 may not necessarily have records corresponding to all users registered in the user registration table 541. For example, records of all employees may be registered in the authentication server 100 and records of only employees belonging to a department in which the MFP 200 is equipped may be registered in the MFP 200.

Also, the user restriction table 341 is provided with a record of an unregistered user who is a user that is not registered in the user restriction table 341. A record having an ID '999' corresponds to the record of the unregistered user and 'unregistered' is stored in the user name. Hereinafter, this record is referred to as an 'unregistered record'. In the meantime, a record that is used when the user authentication is successful and that specifies a user is referred to as a 'user-specified record', such as '001' and '002'.

Since the affiliation of the unregistered user is unclear, the affiliation of the unregistered record is not set. Also, in the unregistered record, the MFP 200 cannot manage whether the image processing can be executed, for each user. For this reason, the execution of the image processing is more restricted in the unregistered record than in the user-specified record. Specifically, in the unregistered record, at least one of an executable function and an executable amount of the image processing is less than that of the user-specified record. For instance, in an example shown in FIG. 3, the scan cannot be executed in the unregistered record but can be executed in the user-specified record. Also, the unregistered record has the smaller maximum number than the user-specified record.

Subsequently, an operation outline of the image processing system 900 will be described. In the image processing system 900, the user information is registered beforehand in the user registration table 541 of the authentication server 100 by a manager. Also, a manager sets the restriction information for each user in the user restriction table 341 of the MFP 200 in advance. The manager of the authentication server 100 and the manager of the MFP 200 may be same or may be different.

Figure 4:
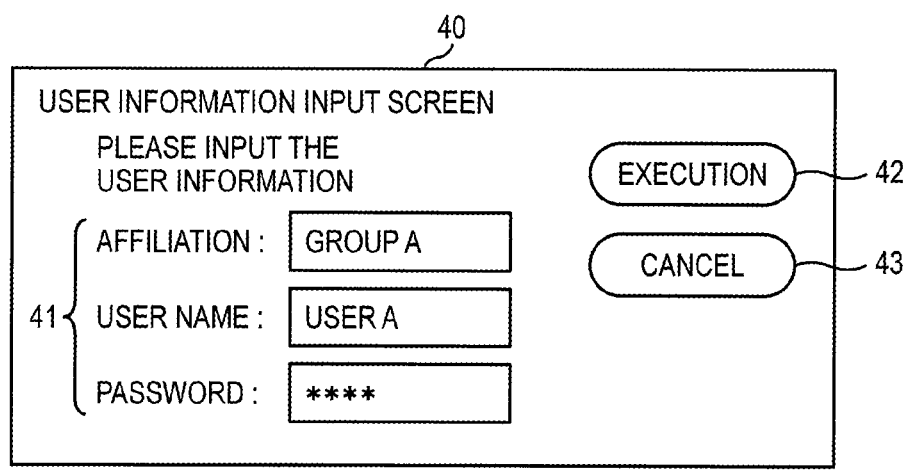
FIG. 4 shows a user information input screen that is displayed by the MFP.

In order to execute the image processing by the MFP 200, it is necessary that the user authentication by the authentication server 100 has been successful. For this reason, a user who uses the MFP 200 inputs the user information, which is necessary for the user authentication, in the MFP 200. FIG. 4 shows a user information input screen that is displayed on the operation panel 40. The user information input screen has an input part 41, an execution button 42 and a cancel button 43. An affiliation, a user name and a password, which are the user information, can be respectively input in the input part 41. Completion of an input operation of the user information can be input by the execution button 42. A cancel request of the input operation of the user information can be input by the cancel button 43. The user inputs the user information in the input part 41 and then touches the execution button 42. When the execution button 42 is touched, the input of the user information is completed.

The input method of the user information is not limited to the input operation on the operation panel 40 and an IC card having the user information stored therein may be set at a predetermined reading position of the IC card reader 39. When the IC card is set at the predetermined reading position, the MFP 200 causes the IC card reader 39 to read out the user information stored in the IC card.

After the MFP 200 receives the user touch operation on the execution button 42, the MFP 200 requests the authentication server 100 to authenticate a user, based on the user information input in the input part 41. Alternatively, after the IC card reader 39 reads out the user information from the IC card, the MFP 200 requests the authentication server 100 to authenticate a user, based on the read user information. Then, the MFP 200 extracts a record from the user restriction table 341, depending on the authentication result. The MFP 200 can execute the image processing within a range permitted in the restriction information of the extracted record.

Subsequently, operations of the MFP 200 of the image processing system 900 will be described by referring to two embodiments in which timings at which the user authentication is performed are different. In the first embodiment, the user authentication is performed after a start request of a job is received, and the job, which is a target of the start request, is completed on condition that the user authentication has been successful. In the second embodiment, the user authentication is first performed, and then, the MFP 200 becomes capable of receiving a job on condition that the user authentication has been successful. Then, the job that is received is completed.

First Embodiment

First, job execution processing, which is executed by the MFP 200 so as to realize the operations of the first embodiment, will be described with reference to a flowchart of FIG. 5 (5A, 5B). The job execution processing is executed by the CPU 31 when the MFP 200 receives a start request of a job accompanied by the image processing.

The job accompanied by the image processing includes 'FAX transmission' of reading a document and transmitting the read image through the FAX interface 38, 'scanning' of reading a document and preserving the read image in a file, 'copying' of reading a document and printing the read image, 'PC printing' of printing image data received from an external apparatus such as a personal computer (PC) through the network interface 37 and 'FAX reception printing' of printing image data received from the external apparatus through the FAX interface 38.

In the job execution processing, the MFP 200 requests a user is to input the user information, and the user information input by the user, i.e., the affiliation, the user name and the password are respectively acquired by the MFP 200 (S101). That is, with respect to an input through the operation panel 40, the MFP 200 displays the user information input screen on the operation panel 40 and acquires the user information input in the input part 41. With respect to an input through the IC card reader 39, the MFP 200 acquires the user information that is read out from the IC card by the IC card reader 39.

After S101, the MFP 200 outputs an authentication request to the authentication server 100 (S102). The user information acquired in S101 is added to the authentication request.

Figure 6:
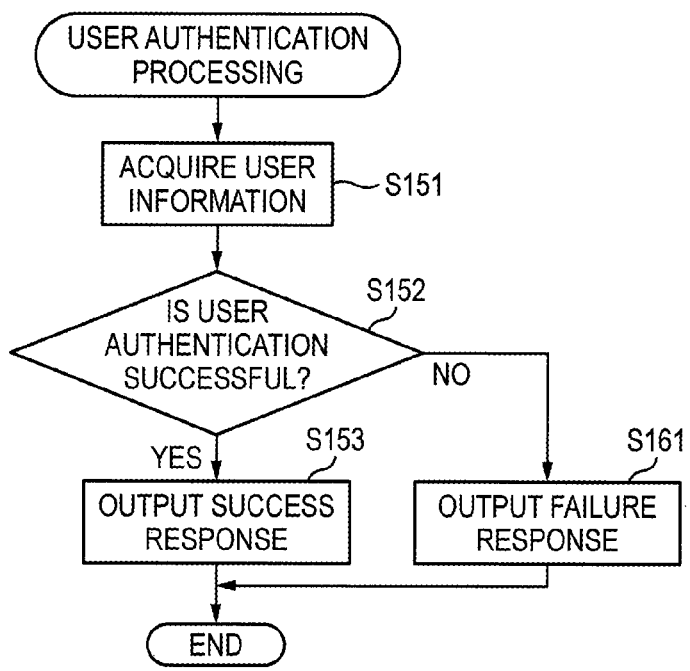
FIG. 6 is a flowchart showing a sequence of user authentication processing that is executed by an authentication server.

Here, user authentication processing that is executed by the authentication server 100 will be described with reference to a flowchart of FIG. 6. The user authentication processing is executed by the CPU 51 when the authentication request is received.

In the user authentication processing, the authentication server acquires the user information added to the authentication request (S151). Specifically, the authentication server acquires the respective information of the affiliation, the user name and the password. Then, the authentication server performs user authentication and determines whether the user authentication has been successful (S152). In S152, the authentication server retrieves a record, which coincides with the user information, the affiliation, the user name and the password acquired in S151, by referring to the user registration table 541, and determines that the authentication has been successful when the record is retrieved and determines that the authentication has failed when the record is not retrieved.

After S152, the authentication server transmits a result of the user authentication to the MFP 200. That is, when the user authentication has been successful (S152: YES), the authentication server responds that the user authentication has been successful (S153). On the other hand, when the user authentication has failed (S152: NO), the authentication server responds that the user authentication has failed (S161). After S153 or S161, the user authentication processing by the authentication server 100 ends.

Figure 5B:
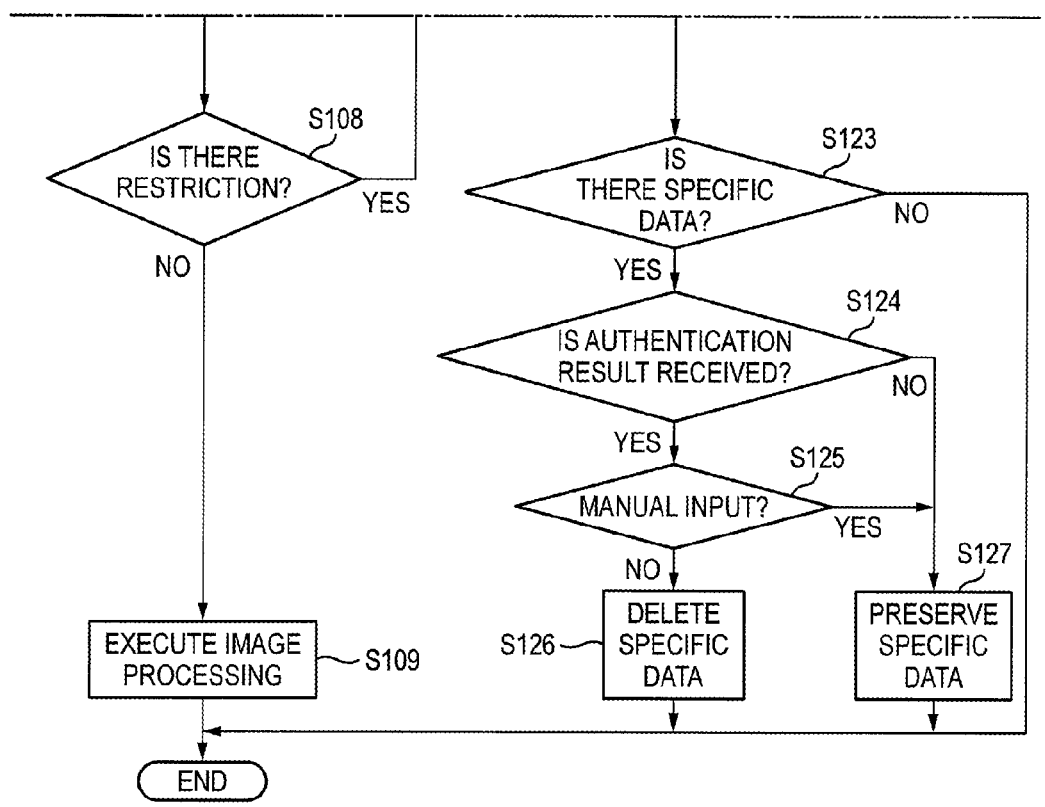
FIG. 5 (5A, 5B) is a flowchart showing a sequence of job execution processing that is executed by the MFP.

Returning to the job execution processing of the MFP 200 in FIG. 5, after the MFP 200 outputs the authentication request in S102, the MFP 200 executes execution restriction determination processing of determining whether a specific operation, which is a portion of an operation for completing a job that is a target of the start request, can be executed (S103). The details of the specific operation will be specifically described later. In the meantime, S102 and S103 may be executed in reversed order or may be executed at the same time.

Here, the execution restriction determination processing of S103 will be described with reference to a flowchart of FIG. 7.

In the execution restriction determination processing, the MFP 200 first determines whether there is the user registration in the MFP 200, based on the user information acquired in S101 (S111). In S111, the MFP 200 refers to the user restriction table 341 and determines that there is the user registration in the MFP 200 when there is a record in which the same user name as the user name acquired in S101 is stored and determines that there is no user registration in the MFP 200 when there is no record. When it is determined that there is the user registration in the MFP 200 (S111: YES), the MFP 200 permits execution of the specific operation since it can be determined that there is a high possibility that the user authentication will be successful and that there is a low possibility that the specific operation will be in vain (S116).

When it is determined that there is no user registration in the MFP 200 (S111: NO), the MFP 200 determines whether communication speed with the authentication server 100 is lower than a threshold value (S112). When it is determined that the communication speed is lower than the threshold value (S112: YES), the MFP 200 permits the execution of the specific operation because it can be determined that it takes time to receive the authentication result and to transmit and receive the image data and thus there is a high possibility that the start of the image processing will be delayed (S116).

When it is determined that the communication speed is the threshold value or higher (S112: NO), the MFP 200 determines whether a type of a job for which the start request is received is a specific job (S113). The specific job includes a job for which many setting operations are made on the operation panel 40. For example, the specific job includes FAX transmission, scan and copy. On the other hand, the PC printing and FAX reception printing do not correspond to the specific job because the setting operations on the operation panel 40 are less. Regarding the job for which many setting operations are made on the operation panel 40, by enabling early start of the setting operation on the operation panel 40, as the specific operation, an early start of the image processing can be expected. Thus, when the received job is the specific job (S113: YES), the MFP 200 permits the execution of the specific operation (S116).

When the received job is not the specific job (S113: NO), the MFP 200 determines whether the MFP 200 is in an overload state (S114). The overload state includes a state where other jobs are being executed and a state where an available memory capacity is a threshold value or smaller. When the MFP 200 is in the overload state (S114: YES), the MFP 200 does not permit the execution of the specific operation, because there is a high possibility that if the specific operation is executed, it will have a bad influence on the other processing (S115). On the other hand, when the MFP 200 is not in the overload state (S114: NO), the MFP 200 permits the execution of the specific operation because influence of the specific operation to the other processing is smaller (S116).

In this illustrative embodiment, the four conditions of S111 to S114 are determined as the conditions for restricting the execution of the specific operation in S105. However, all of the conditions need not necessarily be determined. That is, at least one condition needs to be determined in the execution restriction determination processing of S103. Alternatively, the processing of S103 may be omitted, and the processing may proceed to S105 after S102 so that the specific operation is always started. After S115 or S116, the execution restriction determination processing ends.

Returning to the job execution processing of FIG. 5, after S103, the MFP 200 determines whether the execution of the specific operation is permitted (S104). When the execution of the specific operation is permitted (S104: YES), the MFP 200 executes a specific operation corresponding to the job for which the start request is received (S105). That is, the MFP 200 starts the specific operation of the image processing before the result of the user authentication is received. After starting the specific operation, the MFP 200 shifts to S106 and waits for a result of the user authentication. Also, when the execution of the specific operation is not permitted (S104: NO), the MFP 200 shifts to S106 and waits for a result of the user authentication without starting the specific operation.

The specific operation for starting the execution in S105 is different depending on a type of the job. The types of the specific operation depending on types of the job in the MFP 200 are shown in FIG. 8. For example, when a type of the job is PC printing, the MFP 200 performs ink cleaning and warming up of a fixing device in correspondence to a printing method of the image forming unit 10. That is, the MFP 200 selects a specific operation, which is to be started to be executed in 105, from the plurality of specific operations, depending on a content of the job.

Figures 7, 8:
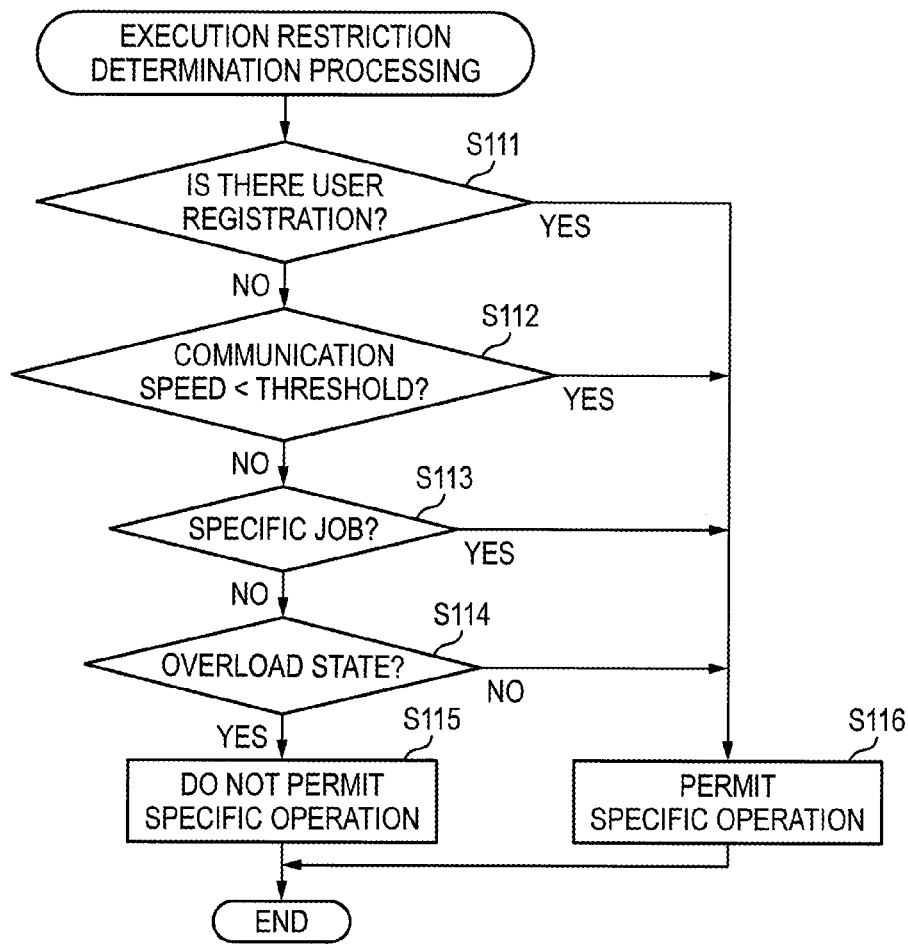
FIG. 7 is a flowchart showing a sequence of execution restriction determination processing that is executed by the MFP.
FIG. 8 shows combinations of a type of a job and a type of a specific operation.

In the meantime, the specific operation is not limited to the processing shown in FIG. 8, and any operation may be possible inasmuch as the specific operation is a portion of the processing that is necessary to be performed until a job is completed and the specific operation is executed before an image is output. For example, for a job for which a reading operation should be performed by the image reading unit 11 and then other processing such as transmission, printing, file preservation and the like is performed, such as FAX transmission, copy, scan and the like, the reading operation may be the specific operation. Also, for example, for a job for which a printing operation should be performed by the image forming unit 10 and development processing of received image data should be performed before the printing operation starts, such as PC printing, FAX reception printing, copy and the like, the development processing may be the specific operation.

After S106 or when the execution of the specific operation is not permitted (S104: NO), the MFP 200 determines whether a result of the user authentication is received from the authentication server 100 (S106). When a result of the user authentication is not received from the authentication server 100 (S106: NO), the MFP 200 determines whether a timeout time period has elapsed after the authentication request is output in S102 (S121). When the timeout time period has not elapsed (S121: NO), the MFP 200 waits until a result of the user authentication is received or the timeout time period has elapsed.

When a result of the user authentication is received (S106: YES), the MFP 200 determines whether the authentication result has been successful (S107). When a success result is received (S107: YES), the MFP 200 determines whether the image processing of the job for which the start request is received is restricted (S108). Specifically, in 108, the MFP 200 extracts a user-specified record, which corresponds to the authenticated user, from the user restriction table 341. When there is no corresponding user-specified record, the MFP 200 extracts the unregistered record. Then, the MFP 200 determines whether it is possible to execute the image processing of the job for which the start request is received, based on the restriction information of the extracted record, and determines that the image processing is restricted when it is determined that the image processing of the job cannot be executed.

When the image processing is not restricted (S108: NO), the MFP 200 starts the execution of the image processing of the job for which the start request is received (S109). In S109, when the specific operation has not started, the MFP 200 starts the specific operation. When the specific operation has started but is not completed, the MFP 200 waits for the completion of the specific operation and then starts the execution of the image processing. That is, the MFP 200 completes the job after completing the specific operation. After S109, the MFP 200 ends the job execution processing.

On the other hand, when a failure result is received (S107: NO), when the image processing is restricted (S108: YES) or when the timeout time period has elapsed (S121: YES), the MFP 200 does not start the execution of the image processing and stops the specific operation if the specific operation is being executed (S122).

After that, the MFP 200 determines whether there is specific data that is data generated by the specific operation (S123). The specific data includes transmission data before the FAX transmission, scan data before it is stored in a server or storage and copy data before the printing, in the job accompanied by reading operation, and includes development data before the printing, in the job accompanied by the printing operation. When there is no specific data (S123: NO), the MFP 200 ends the job execution processing.

When there is the specific data (S123: YES), the MFP 200 determines whether the authentication result is received (S124). When the authentication result is not received, i.e., when the timeout situation occurs (S124: NO), there is a high possibility that the communication with the authentication server 100 can not be performed. In this case, when the communication is restored, the specific data can be used. For this reason, the specific data is preserved in a predetermined storage device (S127). The storage device that is a preservation place may be the NVRAM 34 or a server for preservation (not shown).

When the authentication result is received (S124: YES), the MFP 200 determines whether the input of the user information is made through a manual input by the operation on the operation panel 40 (S125). When it is determined that the manual input is made (S125: YES), an erroneous input of the user may be regarded as one reason of the authentication failure. In this case, the user authentication may be successful by a retry operation and the specific data can be used if the user authentication has been successful. For this reason, the specific data is preserved in the predetermined storage device (S127). On the other hand, when the input of the user information is made through an automatic input using the IC card (S125: NO), it is difficult to consider an erroneous input of the user as one reason of the authentication failure. In this case, a possibility that the user authentication will be successful even by a retry operation is very low. For this reason, since there is a high possibility that the specific data will be useless, the MFP 200 deletes the specific data (S126). After S126 or S127, the MFP 200 ends the job execution processing.

That is, in the job execution processing of the first embodiment, the specific operation corresponding to the content of the job is started within a time period during which the MFP 200 waits until it is determined that the user authentication is successful. That is, the MFP 200 starts a portion of the operation for completing the job before it is determined that the user authentication is successful. Thereby, it can be expected that the job will be completed at an early stage by the MFP 200.

Meanwhile, in the first embodiment, after the authentication has been successful, the specific operation that can be further executed is restricted for the user authenticated in S108 based on the restriction information. However, the specific operation may be restricted in S105 at which the specific operation is started, based on the user information acquired in 101.

Also, in the first embodiment, the restriction information corresponding to the authenticated user is provided and the image processing that can be further executed is restricted for the authenticated user. However, the execution of the image processing for the authenticated user need not necessarily be restricted. In this case, the user restriction table 341 and the processing of S108 in the job execution processing are not necessary.

Second Embodiment

Figures 9, 9A:
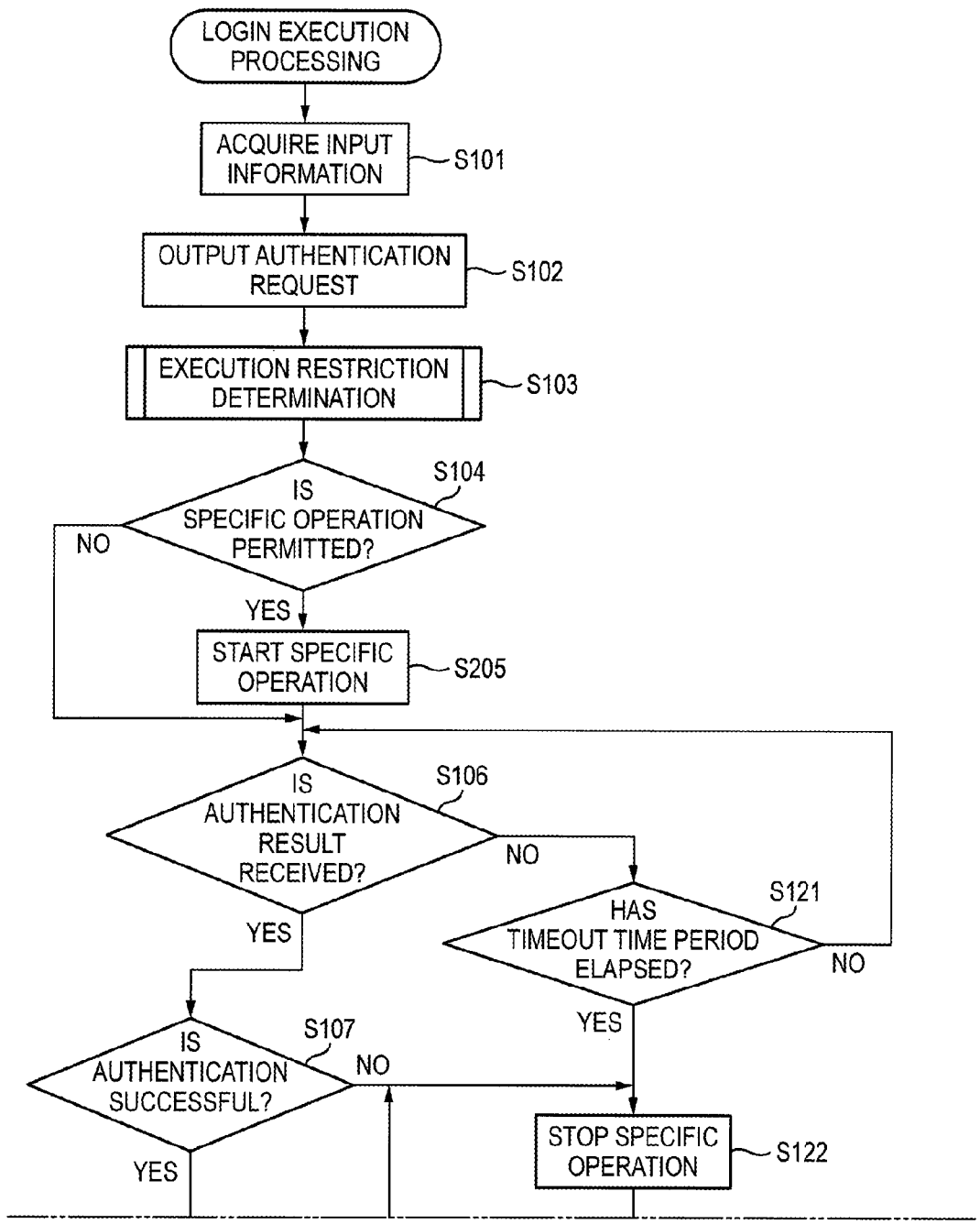
FIG. 9 (9A, 9B) is a flowchart showing a sequence of login execution processing that is executed by the MFP.
Figure 9B:
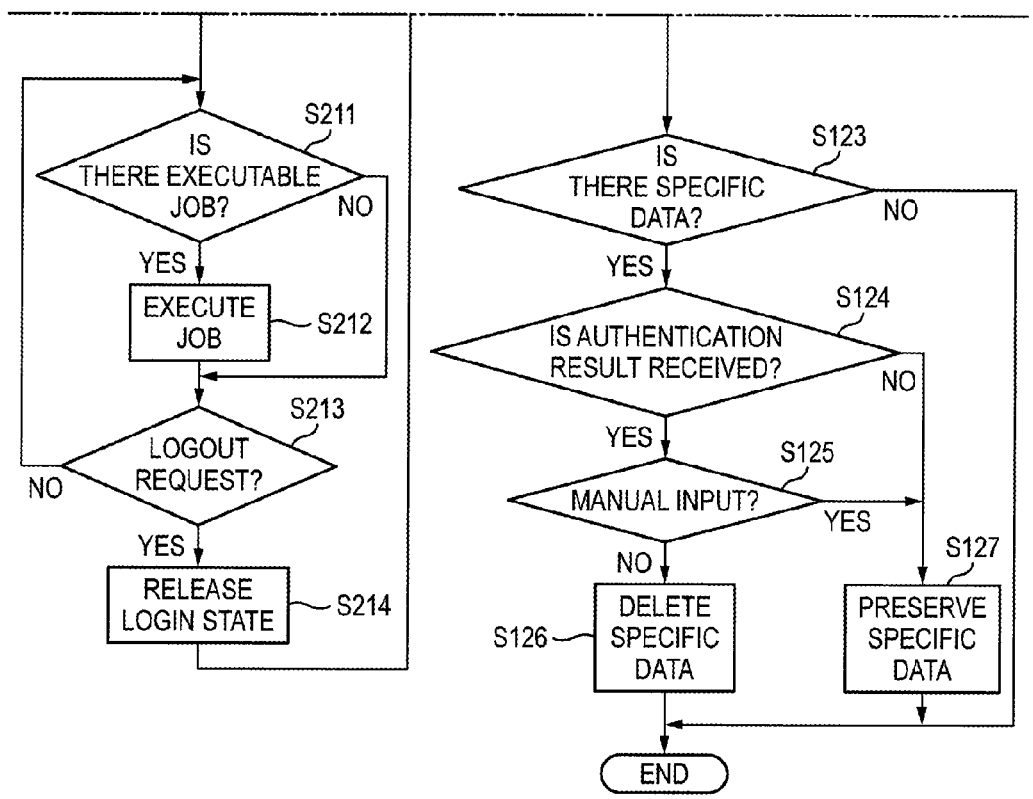

Subsequently, login execution processing, which is executed by the MFP 200 so as to realize the operations of the second embodiment, is described with reference to a flowchart of FIG. 9 (9A, 9B). The login execution processing is executed by the CPU 31 when the MFP 200 receives a login request of requesting a login from the MFP 200. In the meantime, the same processing as the job execution processing of the first embodiment will be denoted with the same reference numerals and the descriptions thereof will be omitted.

In the login execution processing, the MFP 200 first requests the user to input the user information and acquires the user information input by the user (S101). Then, the MFP 200 outputs an authentication request to the authentication server 100 (S102).

After 102, the MFP 200 executes the execution restriction determination processing shown in FIG. 7 (S103). In the meantime, S102 and S103 may be executed in reversed order or may be executed at the same time. Also, since a job is not received in the login execution processing, the MFP 200 does not execute the determination of S113 in the execution restriction determination processing. That is, when a result of the determination of S112 in execution restriction determination processing is NO, the MFP 200 proceeds to 114.

After 103, the MFP 200 determines whether it is permitted to execute the specific operation (S104). When it is permitted to execute the specific operation (S104: YES), the MFP 200 executes a specific operation corresponding to the user information acquired in S101 (S205). That is, the MFP 200 starts the specific operation of the image processing before a result of the user authentication is received. After starting the specific operation, the MFP 200 proceeds to S106 and waits for a result of the user authentication. Also, when it is not permitted to execute the specific operation (S104: NO), the MFP 200 proceeds to S106 and waits for a result of the user authentication without starting the specific operation.

Specifically, in S205, the MFP 200 extracts a user-specified record, which corresponds to a user specified by the user information, from the user restriction table 341. When there is no corresponding user-specified record, the MFP 200 extracts the unregistered record. Then, the MFP 200 determines whether it is possible to execute the job for each type of the job, based on the restriction information of the extracted record. Then, the MFP 200 extracts an executable job, and further, selects a specific operation for each type of the extracted job (refer to FIG. 8). That is, the MFP 200 selects a specific operation that is to be started to be executed in S205, based on the restriction information corresponding to the user information. Then, the MFP 200 starts executing the selected specific operation.

After S205 or when it is not permitted to execute the specific operation (S104: NO), the MFP 200 determines whether a result of the user authentication is received from the authentication server 100 (S106). When a result of the user authentication is not received (S106: NO), the MFP 200 determines whether the timeout time period has elapsed (S121). When the timeout time period has not elapsed (S121: NO), the MFP 200 waits until a result of the user authentication is received or the timeout time period has elapsed.

When a result of the user authentication is received (S106: YES), the MFP 200 determines whether the authentication result is successful or not (S107). When a success result is received (S107: YES), the MFP 200 determines whether an executable job is received (S211). The MFP 200 determines whether a job can be executed based on the restriction information. When an executable job is received (S211: YES), the MFP 200 executes the corresponding job (S212). In S212, when the specific operation has not started, the MFP 200 starts the specific operation. When the specific operation has started but is not completed, the MFP 200 waits for the completion of the specific operation and then starts executing a remaining operation for completing the job. That is, the MFP 200 completes the job after completing the specific operation.

After S212 or when an executable job is not received (S211: NO), the MFP 200 determines whether a logout request for requesting a logout from the MFP 200 is received (S213). When the logout request is not received (S213: NO), the MFP 200 proceeds to S211. Then, the MFP 200 waits for a job or an input of the logout request. When the logout request is received (S213: YES), the MFP 200 deactivates the login state (S214).

After S214, when a failure result is received (S107: NO) or when the timeout time period has elapsed (S121: YES), the MFP 200 stops the specific operation that is being executed (S122). The processing after S112 is the same as the processing after S122 in the job execution processing of the first embodiment.

That is, in the login execution processing of the second embodiment, the specific operation corresponding to the restriction information of the login user starts before it is determined that the user authentication is successful. Thereby, in the MFP 200, it can be expected that the job will be completed at an early stage, like the job execution processing of the first embodiment.

As specifically described above, the MFP 200 starts the specific operation, which is a portion of the operation for completing the job, during the waiting time period after the MFP 200 requests the authentication server 100 to authenticate the user until the result of the user authentication is received. Thereby, it is possible to effectively utilize the waiting time period in the MFP 200.

The above illustrative embodiment is merely an example and is not construed to limit the invention. Therefore, the invention can be variously modified and changed without departing from the scope of the invention. For example, the image processing apparatus may be an arbitrary apparatus insofar as it has an image processing function, and may be a copier, a printer, a scanner and a FAX apparatus, in addition to the MFP 200.

Figure 10:
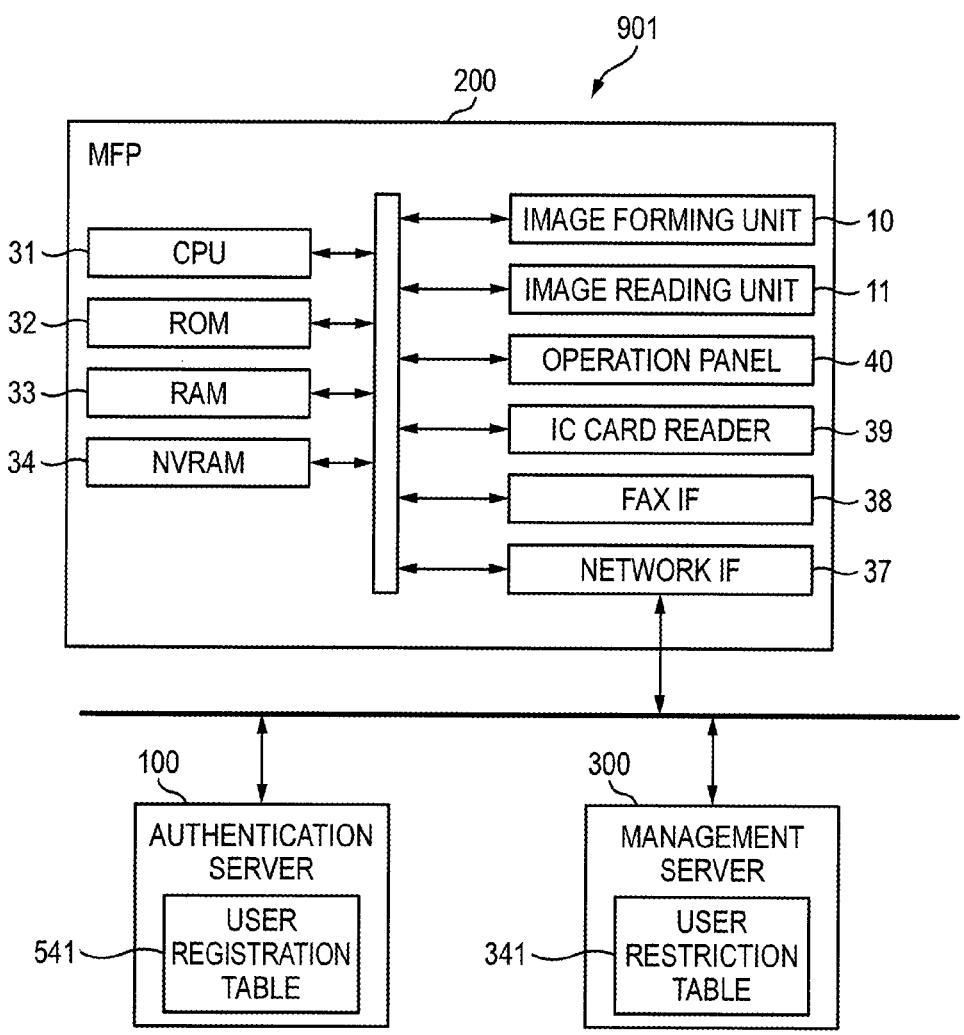
FIG. 10 is a block diagram showing another configuration of an image processing system according to an illustrative embodiment.

In the above illustrative embodiment, the MFP 200 has the user restriction table 341. However, as shown in the image processing system 901 of FIG. 10, a management server 300 having the user restriction table 341 may be provided and the restriction information of the image processing may be acquired from the management server 300, based on a result of the authentication in the authentication server 100. When the restriction information of the image processing is acquired from the management server 300 that is an external apparatus, it is possible to reduce the load of the memory of the MFP 200. Also, when the management server 300 is commonly used among a plurality of the image processing apparatuses, it is possible to save the trouble of setting the restriction information in the plurality of image processing apparatuses. On the other hand, when the MFP 200 has the user restriction table 341 and reads out the restriction information of the image processing, it is possible to reduce the communication load and reduce a risk of being affected by a communication state.

Also, in the above illustrative embodiment, the unregistered record is provided, and a general restriction information, which is applied to all users who are not registered in the user restriction table 341, is provided. However, the invention is not limited thereto. For example, the unregistered record may not be provided and the image processing may be restricted for a user who is not registered in the user restriction table 341.

Also, in the above illustrative embodiment, when the success result of the user authentication is not obtained from the authentication server 100, the image processing is restricted. However, the invention is not limited thereto. For example, a general restriction information, which is applied when the success result of the user authentication is not obtained from the authentication server 100, may be provided, and the execution of a portion of the image processing may be permitted on the basis of the general restriction information.

Also, in the above illustrative embodiment, the specific operation starts after outputting the authentication request. However, the specific operation may start before outputting the authentication request. That is, the specific operation may start after the user information is input in S101.

Also, in the above illustrative embodiment, in S124 or S125, the specific data is preserved or deleted depending on situations. However, the condition of preserving or deleting the specific data is not limited thereto. For example, when the number of times of the authentication failure becomes larger than a threshold value, the specific data may be deleted. Also, when the authentication fails at a predetermined time zone, the specific data may be deleted.

Also, in the above illustrative embodiment, in S124 or S125, the specific data is preserved or deleted depending on situations. However, the specific data may not be preserved or deleted depending on situations. That is, when there is the specific data at the time that it is determined not to execute the image processing, the specific data may be deleted.

Also, the processing described in the illustrative embodiment may be executed by hardware such as a single CPU, a plurality of CPUs and an ASIC or a combination thereof. Also, the processing described in the illustrative embodiment may be implemented by a variety of aspects such as a recording medium recording a program for executing the processing, a method, and the like.

The present invention provides illustrative, non-limiting aspects as follows:

(1) In a first aspect, there is provided an image processing apparatus including: a first interface; a second interface configured to be connected with a server, the server being configured to perform user authentication; an image processing unit configured to execute a job, the job including image processing; and a control device configured to: receive authentication information of a user via the first interface; transmit the received authentication information to the server via the second interface; execute a specific operation after receiving the authentication information, the specific operation being a part of the job; receive a result of the user authentication from the server after executing the specific operation; determine whether the user authentication by the server has been successful in accordance with the received result; and execute the rest of the job after completing the specific operation and determining that the user authentication has been successful.

According to the first aspect, the image processing apparatus can perform communication with the server performing the user authentication, and the image processing by the image processing unit is permitted on the basis of a result of the user authentication performed by the server. Also, when requesting the server to authenticate a user, the image processing apparatus receives the input of the authentication information and then starts a specific operation without waiting for a success determination of the user authentication. Here, the specific operation is a portion of an operation necessary for completing a job during which the image processing unit performs the image processing. The specific operation includes ink cleaning, warming up of a fixing device, warming up of a scanner, reception of a setting input to an operation panel and the like, for example. Also, the specific operation may be a portion of a processing that is necessary until a job is completed. For example, among reading and printing operations which are necessary for a copy, the reading operation may be set as the specific operation.

That is, in the image processing apparatus disclosed in the specification, the specific operation starts during a waiting time period, which is a time period after receiving the input of the user authentication and until determining that the user authentication is successful. Thereby, it is possible to effectively utilize the waiting time period in the image processing apparatus.

(2) In a second aspect, there is provided the image processing apparatus according to the first aspect, wherein the specific operation includes a plurality of types of operations, and wherein the control device is configured to select a type of the specific operation to be executed based on a content of the job.

The type of the specific operation is different depending on a content of the job, such as a type of the job and a method of the image processing. For this reason, it is preferable to select and execute the specific operation depending on the content of the job.

(3) In a third aspect, there is provided the image processing apparatus according to the first aspect, wherein the specific operation includes a plurality of types of operations, and wherein the control device is configured to select a type of the specific operation to be executed based on restriction information, which corresponds to the authentication information received by the first interface and restricts at least one of an executable function and an executable amount of the image processing.

That is, when an execution function is restricted on the basis of the restriction information, there is a high possibility that the specific operation relating to the restricted function will be useless. For this reason, it is preferable to select and execute a type of the specific operation based on the restriction information of each user.

(4) In a fourth aspect, there is provided the image processing apparatus according to the first aspect, further including a storage unit configured to store therein specific data which is generated by executing the specific operation, wherein the control device is configured to delete the specific data stored in the storage unit when it is determined that the user authentication has failed.

The case where the user authentication fails includes a case where communication with the server can not be performed, in addition to the case where the authentication failure result is received from the server. When the user authentication fails, the image processing is not permitted. For this reason, it is preferable to delete the specific data to reduce a memory load.

(5) In a fifth aspect, there is provided the image processing apparatus according to the fourth aspect, wherein, when a deletion restriction condition of restricting the deletion of the specific data has been satisfied, the control device is configured not to delete the specific data even when it is determined that the user authentication has failed.

Even in a case where the user authentication has failed, the user authentication may immediately succeed thereafter. For this reason, it is preferable not to delete the specific data when the deletion restriction condition of restricting the deletion of the specific data is satisfied.

(6) In a sixth aspect, there is provided the image processing apparatus according to the fifth aspect, wherein the deletion restriction condition is satisfied when it is determined that communication with the server can not be performed.

In a case where the communication can not be performed, there is a high possibility that the authentication result can be received after the communication is restored. Therefore, it is preferable to maintain the specific data without deleting the specific data.

(7) In a seventh aspect, there is provided the image processing apparatus according to the fifth aspect, further including an operational interface, wherein the deletion restriction condition is satisfied when the first interface receives the input of the authentication information of the user through the operational interface.

In a case where the authentication information has been received through the operational interface, even if the user authentication has failed, there is a high possibility that a retry operation of re-inputting the authentication information will be performed. For this reason, it is preferable to maintain the specific data without deleting the specific data.

(8) In an eighth aspect, there is provided the image processing apparatus according to the first aspect, wherein the control device is configured to restrict the execution of the specific operation when an execution restriction condition, which is a condition for restricting the execution of the specific operation, has been satisfied.

The execution restriction condition includes, for example, a condition where main body authentication fails, a condition where communication speed is high, a condition where it does not take much time to start executing the specific operation, a condition where another job is being executed, and a condition where a memory is full. If the specific operation is executed after the input of the authentication information has been received and before it is determined that the user authentication has succeeded, a load of the control device or memory increases. For this reason, it is preferable to set the execution restriction condition so as to be able to select whether or not to execute the specific operation.

(9) In a ninth aspect, there is provided an image processing system including: an image processing apparatus configured to be connected with a server and execute a job, the job including image processing; and the server configured to store user information for identifying a user, wherein the image processing apparatus is configured to receive authentication information of a user, wherein the image processing apparatus is configured to transmit the received authentication information to the server, wherein the image processing apparatus is configured to execute a specific operation after receiving the authentication information, the specific operation being a part of the job, wherein the server is configured to perform user authentication by using the transmitted authentication information, wherein the image processing apparatus is configured to receive a result of the user authentication from the server after executing the specific operation, wherein the image processing apparatus is configured to determine whether the user authentication by the server has been successful in accordance with the received result, and wherein the image processing apparatus is configured to execute the rest of the job after completing the specific operation and determining that the user authentication has been successful.

According to the aspects, it is possible to implement an image processing apparatus and an image processing system capable of effectively utilizing time after a server is requested to authenticate a user until a result of the user authentication is acquired.

What is claimed is:

1. An image processing apparatus comprising:
    a first interface;
    a second interface configured to be connected with a server, the server being configured to perform user authentication;
    an image processing unit configured to execute at least part of a job, including image processing, the job including a first part of the job and a second part of the job; and
    a control device configured to:
        receive authentication information of a user via the first interface;
        transmit the received authentication information to the server via the second interface;
        start executing the first part of the job after receiving the authentication information and before receiving a result of the user authentication from the server;
        receive the result of the user authentication from the server after starting the execution of the first part of the job;
        determine whether the user authentication by the server has been successful in accordance with the received result
    execute the rest of the first part of the job, in a case where the execution of the first part of the job has not been completed when it is determined that the user authentication has been successful; and
    start executing the second part of the job after completing the execution of the first part of the job and when it is determined that the user authentication has been successful.

2. The image processing apparatus according to claim 1,
    wherein the first part of the job includes a plurality of types of operations, and
    wherein the control device is configured to select a type of the first part of the job to be executed based on a content of the job.

3. The image processing apparatus according to claim 1,
    wherein the first part of the job includes a plurality of types of operations, and
    wherein the control device is configured to select a type of the first part of the job to be executed based on restriction information, which corresponds to the authentication information received by the first interface and restricts at least one of an executable function and an executable amount of the image processing.

4. The image processing apparatus according to claim 1, further comprising a storage unit configured to store therein specific data which is generated by executing the first part of the job,
    wherein the control device is configured to delete the specific data stored in the storage unit when it is determined that the user authentication has failed.

5. The image processing apparatus according to claim 4,
    wherein, when a deletion restriction condition of restricting the deletion of the specific data has been satisfied, the control device is configured not to delete the specific data even when it is determined that the user authentication has failed.

6. The image processing apparatus according to claim 5,
    wherein the deletion restriction condition is satisfied when it is determined that communication with the server can not be performed.

7. The image processing apparatus according to claim 5, further comprising an operational interface,
    wherein the deletion restriction condition is satisfied when the first interface receives the input of the authentication information of the user through the operational interface.

8. The image processing apparatus according to claim 1,
    wherein the control device is configured to restrict the execution of the first part of the job when an execution restriction condition, which is a condition for restricting the execution of the first part of the job, has been satisfied.

9. The image processing apparatus according to claim 1,
    wherein the first part of the job does not include outputting an image, and the second part of the job includes outputting an image.

10. The image processing apparatus according to claim 1,
    wherein the image processing unit includes an image forming unit, and
    wherein the first part of the job is at least one of development processing and warming up of the image forming unit, and the second part of the job includes printing an image.

11. The image processing apparatus according to claim 1,
    wherein the image processing unit includes an image reading unit, and
    wherein the first part of the job is at least one of reading processing and warming up of the image reading unit.

12. The image processing apparatus according to claim 1, further comprising an operational interface,
    wherein the first part of the job is reception of an operation by the operational interface.

13. An image processing system comprising:
    an image processing apparatus configured to be connected with a server and execute at least part of a job, including image processing, the job including a first part of the job and a second part of the job; and
    the server configured to store user information for identifying a user,
    wherein the image processing apparatus is configured to receive authentication information of the user, wherein the image processing apparatus is configured to transmit the received authentication information to the server, wherein the image processing apparatus is configured to start executing the first part of the job after receiving the authentication information and before receiving a result of the user authentication from the server, wherein the server is configured to perform user authentication by using the transmitted authentication information, wherein the image processing apparatus is configured to receive the result of the user authentication from the server after starting the execution of the first part of the job, wherein the image processing apparatus is configured to determine whether the user authentication by the server has been successful in accordance with the received result, wherein the image processing apparatus is configured to execute the rest of the first part of the job, in a case where the execution of the first part of the job has not been completed when it is determined that the user authentication has been successful; and wherein the image processing apparatus is configured to start executing the second part of the job after completing the execution of the first part of the job and when it is determined that the user authentication has been successful.

14. The image processing system according to claim 13, wherein the first part of the job does not include outputting an image, and the second part of the job includes outputting an image.

15. The image processing system according to claim 13, wherein the image processing apparatus includes at least one of an image forming unit, an image reading unit and an operational interface, and wherein the first part of the job includes at least one of development processing, warming up of the image forming unit, reading processing, warming up of the image reading unit and reception of an operation by the operational interface, and the second part of the job includes at least one of transmitting an image, preserving an image and printing an image.

16. The image processing apparatus system according to claim 13, wherein the first part of the job includes a plurality of types of operations, and wherein the image processing apparatus is configured to select a type of the first part of the job to be executed based on a content of the job.

17. The image processing system according to claim 13, wherein the first part of the job includes a plurality of types of operations, and wherein the image processing apparatus is configured to select a type of the first part of the job to be executed based on restriction information, which corresponds to the authentication information received by the image processing apparatus and restricts at least one of an executable function and an executable amount of the image processing.

18. The image processing system according to claim 13, further comprising a storage unit configured to store therein specific data which is generated by executing the first part of the job, wherein the image processing apparatus is configured to delete the specific data stored in the storage unit when it is determined that the user authentication has failed.

19. The image processing system according to claim 18, wherein, when a deletion restriction condition of restricting the deletion of the specific data has been satisfied, the image processing apparatus is configured not to delete the specific data even when it is determined that the user authentication has failed.

20. The image processing system according to claim 13, wherein the image processing apparatus is configured to restrict the execution of the first part of the job when an execution restriction condition, which is a condition for restricting the execution of the first part of the job, has been satisfied.

* * * * *